(12) United States Patent
Ellis et al.

(10) Patent No.: US 10,169,318 B2
(45) Date of Patent: *Jan. 1, 2019

(54) FILTER AND SORT BY FORMAT

(71) Applicant: Microsoft Technology Licensing, LLC, Redmond, WA (US)

(72) Inventors: Charles D. Ellis, Seattle, WA (US); David F. Gainer, Redmond, WA (US); Samuel C. Radakovitz, Seattle, WA (US); Yonghong Zeng, Bellevue, WA (US); Dave McDonald, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,712

(22) Filed: Nov. 8, 2016

(65) Prior Publication Data

US 2017/0097924 A1  Apr. 6, 2017

Related U.S. Application Data

(63) Continuation of application No. 14/202,645, filed on Mar. 10, 2014, now Pat. No. 9,507,496, which is a
(Continued)

(51) Int. Cl.
*G06F 17/00* (2006.01)
*G06F 17/24* (2006.01)
(Continued)

(52) U.S. Cl.
CPC ......... *G06F 17/246* (2013.01); *G06F 3/0482* (2013.01); *G06F 3/04847* (2013.01); *G06F 17/212* (2013.01)

(58) Field of Classification Search
CPC ....... G06F 17/246; G06F 17/24; G06F 17/211
See application file for complete search history.

(56) References Cited

U.S. PATENT DOCUMENTS 5,396,621 A  3/1995  MacGregor et al.
5,861,885 A  1/1999  Strasnick et al.
(Continued)

OTHER PUBLICATIONS

DigDB.com, "Excel Sorting by Text Value, Text Length, Cell Color, Font type", Nov. 9, 2004, pp. 1-5, Retrieved from the internet at the following URL: http://web.archive.org/web/20041109064316/http://www.digdb.com/excel_add_ins/sort_custom_text_length_color/.*
(Continued)

*Primary Examiner* — Ariel Mercado

(57) ABSTRACT

The present invention comprises methods and user interfaces for organizing data displayed within a data application. Specifically, the present invention provides methods and systems for arranging the display of the data by a format applied to one or more portions of the data. The formats comprise different visual characteristics of the displayed data. In exemplary embodiments, the data application organizes the data by the fill color of the cell, the font color of the data within the cell, or the type of icon inserted into the cell. The organizations comprise any type of rearrangement of the data. In exemplary embodiments, the data application sorts or filters the displayed data according to the format.

20 Claims, 21 Drawing Sheets

Related U.S. Application Data continuation of application No. 12/869,367, filed on Aug. 26, 2010, now Pat. No. 8,745,482, which is a continuation of application No. 11/013,628, filed on Dec. 15, 2004, now Pat. No. 7,849,395.

(51) Int. Cl.
  *G06F 3/01* (2006.01)
  *G06F 3/0482* (2013.01)
  *G06F 3/0484* (2013.01)
  *G06F 17/21* (2006.01)

(56) References Cited

U.S. PATENT DOCUMENTS

| | | | |
|---|---|---|---|
| 6,613,098 | B1 | 9/2003 | Sorge et al. |
| 6,738,770 | B2 | 5/2004 | Gorman |
| 6,988,241 | B1 | 1/2006 | Guttman et al. |
| 7,020,652 | B2 * | 3/2006 | Matz ............... H04N 7/16 707/752 |
| 7,849,395 | B2 | 12/2010 | Ellis et al. |
| 8,099,665 | B2 | 1/2012 | Brodersen |
| 8,745,482 | B2 | 6/2014 | Ellis et al. |
| 9,507,496 | B2 | 11/2016 | Ellis et al. |
| 2001/0045965 | A1 | 11/2001 | Orbanes et al. |
| 2002/0036656 | A1 | 3/2002 | Francis et al. |
| 2002/0091728 | A1 | 7/2002 | Kjaer et al. |
| 2002/0116417 | A1 | 8/2002 | Weinberg et al. |
| 2002/0143780 | A1 | 10/2002 | Gorman |
| 2003/0051209 | A1 | 3/2003 | Androski et al. |
| 2003/0188256 | A1 | 10/2003 | Aureglia et al. |
| 2003/0188257 | A1 | 10/2003 | Aureglia et al. |
| 2004/0049730 | A1 | 3/2004 | Ishizaka |
| 2004/0103369 | A1 | 5/2004 | Robertson et al. |
| 2004/0163039 | A1 | 8/2004 | Gorman |
| 2004/0249852 | A1 | 12/2004 | Aureglia et al. |
| 2005/0060343 | A1 | 3/2005 | Gottsman |
| 2005/0197894 | A1 | 9/2005 | Fairbanks et al. |
| 2005/0232055 | A1 | 10/2005 | Couckuyt et al. |
| 2006/0041834 | A1 | 2/2006 | Chen et al. |
| 2006/0074866 | A1 | 4/2006 | Chamberlain et al. |
| 2006/0075328 | A1 | 4/2006 | Becker et al. |
| 2006/0085742 | A1 | 4/2006 | Harold et al. |
| 2006/0106844 | A1 | 5/2006 | Naick et al. |
| 2006/0107196 | A1 | 5/2006 | Thanu et al. |
| 2006/0190814 | A1 | 8/2006 | Collie et al. |
| 2007/0143661 | A1 | 6/2007 | Machalek |
| 2010/0325526 | A1 | 12/2010 | Ellis et al. |

OTHER PUBLICATIONS

Barton, M., "Custom Sort Order"; Internet Publication (online) Feb. 24, 2004; retrieved from the Internet at URL: http://www.keyongtech.com/196738-custom-sort-order> (retrieved on Oct. 5, 2009; 3 pages.

Chinese First Office Action in Chinese Application No. 201010119991.7, dated Jul. 13, 2011 (in Chinese with English translation attached), 9 pages.

Chinese Notice of Allowance dated Dec. 4, 2009, issued in Chinese Application No. 200510125033.X; 4 pages.

Chinese Notice of Allowance in Application 201010119991.7, dated Apr. 5, 2012, 4 pgs.

Chinese Notice of First Office Action, Patent Office of the People's Republic of China; dated Aug. 8, 2008; cited in Application No. 200510125033.X; 12 pages.

Chinese Notice of Second Office Action, Patent Office of the People's Republic of China; dated Jul. 10, 2009; cited in Application 200510125033.X; 6 pages.

Darling, Jeff, et al., "Sort by Color?"; Internet publication (online), Jun. 5, 2002 (retrieved on Mar. 6, 2008); search report reference XP002468614; retrieved from the Internet at URL: http://groups.google.de/group/microsoft.public.excel.worksheet.functions/browse_thread/thread/55feeaa307ef93de/e35677aec50ad972?1=en&Ink=st&q=excel+%22sort+by+color%22#e35677aec50ad972>; 1 page.

European Communication from the EPO for Application No. 05 112 248.9, dated Feb. 22, 2008; 8 pages.

European Communication from the EPO for Application No. 05 112 248.9, dated Feb. 4, 2009; 3 pages.

European Communication of the Board of Appeal in Application No. 05112248.9, dated Jan. 29, 2016, 14 pages.

European Communication of the Board of Appeal in Application No. 05112248.9, dated Feb. 17, 2016, 31 pages.

European Communication Summons to Attend Oral Proceedings from the EPO for Application No. 05 112 248.9, dated Nov. 11, 2009; 7 pages.

European Decision of Board of Appeals in Application 05112248.9, dated Oct. 4, 2016, 22 pages.

European Grounds of Appeal submitted to the EPO for Application No. 05 112 248.9, dated Sep. 1, 2010; 17 pages.

European Minutes of Board of Appeals in Application 05112248.9, dated May 4, 2016, 3 pages.

European Oral Summons in Application No. 05112248.9, dated Nov. 24, 2015, 2 pp.

European Search Report from the EPO for Application No. 05 112 248.9, dated May 20, 2008; 6 pages.

Goshen College, "Lesson 4: Filtering & Sorting"; Aug. 2003; Available online at http://www.goshen.edu/edtech/tutorials/excel/filter.htm; 6 pages.

Indian First Office Action Issued in Patent Application No. 3034/DEL/2005, dated Jan. 23, 2015, 2 pages.

Japanese Notice of Allowance in Application 2005-360929, dated Feb. 24, 2012, 6 pgs.

Japanese Notice of Rejection issued in Patent Application No. 2005-360929, dated Apr. 22, 2011 (in Japanese with English translation attached), 4 pages.

Korean Preliminary Rejection in Application KR1020050101117, dated May 23, 2012, 7 pgs.

Kraynak, J., "Absolute Beginner's Guide to Microsoft Office Excel 2003", published on Sep. 21, 2003, pp. http://flylib.com/books/en/1.550.1.108/1/ to http://flylib.com/books/en/1.550.1.110/1/.

Microsoft—"Microsoft Excel 2000—Lessons 7 and 18"; (Microsoft Press, 1999); ISBN 1-57231-974-7; search reference XP002468615; 36 pages.

Nakajima, Sachiko, "Special technique of 'sorting' depending on the arrangement of the functions," *ASCII.PC*, vol. 7, No. 9, pp. 118-121, ASCII Corporation, Japan, Sep. 1, 2004 (no English translation available).

Rees, Gareth, et al., "Putting Code in Standard Module, Sort by Color"; Nov. 8, 2002; search report reference XP002468613; retrieved from the Internet at URL: http://groups.google.de/group/microsoft.public.excel.worksheet.functions/browse_thread/thread/81463226c7dbb883/926f479d5dbd0ba6?h1=en&Ink=st&q=excel+#22sort+by+color%22#926f479d5bdd0ba6; 2 pages.

Schneider, D., "Sort Order Best Practice Request"; Internet Publication (online) Oct. 17, 2003; search report reference XP007910091; retrieved from the Internet at URL: http://www.amil-archive.com/cf-talk©houseoffusion.com/msg156700.htm; 4 pages.

U.S. Appl. No. 12/869,367, Amendment after Allowance filed Feb. 4, 2014, 3 pgs.

U.S. Appl. No. 12/869,367, Amendment after allowance filed May 5, 2014, 3 pgs.

U.S. Appl. No. 12/869,367, Amendment and Response filed Oct. 11, 2013, 16 pgs.

U.S. Appl. No. 12/869,367, Amendment and Response filed Dec. 12, 2012, 15 pgs.

U.S. Appl. No. 12/869,367, Amendment and Response filed Jun. 28, 2012, 15 pgs.

U.S. Appl. No. 12/869,367, Notice of Allowance mailed Dec. 11, 2013, 22 pgs.

U.S. Appl. No. 12/869,367, Office Action dated Feb. 29, 2012, 25 pgs.

U.S. Appl. No. 12/869,367, Office Action dated Jun. 11, 2013, 22 pgs.

U.S. Appl. No. 12/869,367, Office Action dated Sep. 13, 2012, 20 pgs.

(56) References Cited

OTHER PUBLICATIONS

U.S. Appl. No. 12/869,367, Response to Amendment, dated Mar. 17, 2014, 2 pgs.
U.S. Appl. No. 14/202,645, Amendment and Response filed Jun. 9, 2016, 15 pgs.
U.S. Appl. No. 14/202,645, Notice of Allowance dated Jul. 18, 2016, 19 pgs.
U.S. Appl. No. 14/202,645, Office Action dated Mar. 10, 2016, 28 pgs.
U.S. Appl. No. 11/013,628, Amendment and Response filed Apr. 13, 2010, 23 pages.
U.S. Appl. No. 11/013,628, Amendment and Response filed Aug. 10, 2007, 19 pages.
U.S. Appl. No. 11/013,628, Amendment and Response filed Dec. 16, 2008, 16 pages.
U.S. Appl. No. 11/013,628, Amendment and Response filed Feb. 13, 2007, 13 pages.
U.S. Appl. No. 11/013,628, Amendment and Response filed Jan. 29, 2008, 16 pages.
U.S. Appl. No. 11/013,628, Amendment and Response filed Jul. 30, 2008, 13 pages.
U.S. Appl. No. 11/013,628, Amendment and Response filed Jul. 7, 2009, 26 pages.
U.S. Appl. No. 11/013,628, Amendment and Response filed Mar. 6, 2007, 13 pages.
U.S. Appl. No. 11/013,628, Amendment and Response filed Nov. 30, 2009, 23 pages.
U.S. Appl. No. 11/013,628, Notice of Allowance dated May 27, 2010, 4 pages.
U.S. Appl. No. 11/013,628, Office Action dated Apr. 10, 2009, 35 pages.
U.S. Appl. No. 11/013,628, Office Action dated Apr. 30, 2008, 31 pages.
U.S. Appl. No. 11/013,628, Office Action dated Aug. 31, 2009, 40 pages.
U.S. Appl. No. 11/013,628, Office Action dated Jan. 13, 2010, 35 pages.
U.S. Appl. No. 11/013,628, Office Action dated May 11, 2007, 27 pages.
U.S. Appl. No. 11/013,628, Office Action dated Nov. 13, 2006, 22 pages.
U.S. Appl. No. 11/013,628, Office Action dated Oct. 29, 2007, 24 pages.
U.S. Appl. No. 11/013,628, Office Action dated Sep. 16, 2008, 36 pages.
U.S. Appl. No. 14/202,645, Amendment after Allowance filed Oct. 4, 2016, 3 pgs.
U.S. Appl. No. 14/202,645, USPTO Response to Amendment after Allowance dated Oct. 11, 2016, 2 pgs.

\* cited by examiner

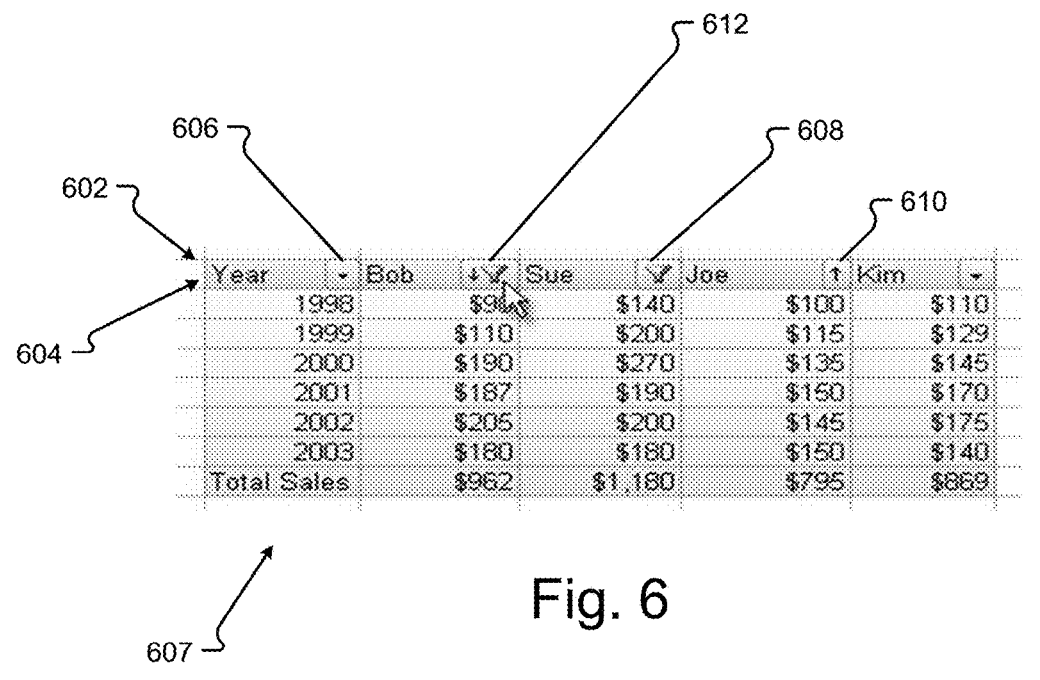

| Year | Bob | Sue | Joe | Kim |
|---|---|---|---|---|
| 1998 | $90 | $140 | $100 | $110 |
| 1999 | $110 | $200 | $115 | $129 |
| 2000 | $190 | $270 | $135 | $145 |
| 2001 | $187 | $190 | $150 | $170 |
| 2002 | $205 | $200 | $145 | $175 |
| 2003 | $180 | $180 | $150 | $140 |
| Total Sales | $962 | $1,180 | $795 | $869 |

Fig. 6

FILTER AND SORT BY FORMAT

CROSS-REFERENCE TO RELATED APPLICATIONS

This application is a continuation application of U.S. patent application Ser. No. 14/202,645 (now U.S. Pat. No. 9,507,496), entitled "FILTER AND SORT BY FORMAT," filed on Mar. 10, 2014, which application is a continuation of U.S. patent application Ser. No. 12/869,367 (now U.S. Pat. No. 8,745,482), entitled "SORTING SPREADSHEET DATA BY FORMAT," filed on Aug. 26, 2010, which application is a continuation of U.S. patent application Ser. No. 11/013,628 (now U.S. Pat. No. 7,849,395), entitled "FILTER AND SORT BY COLOR," filed Dec. 15, 2004, the entire disclosures of which are hereby incorporated herein by reference.

TECHNICAL FIELD

The present invention relates generally to the field of data applications. More particularly, the present invention relates to organizing the presentation of data within data applications.

BACKGROUND OF THE INVENTION

Many programs are available to businesses to organize and save their important data. One of the more pervasive programs is spreadsheet software. Spreadsheet applications are relatively well-known and useful tools. Typical spreadsheet applications simulate physical spreadsheets by capturing, displaying, and manipulating data arranged in rows and columns. To give the data within the spreadsheet more impact, users often change the formatting of data. For example, users often change the background color of a row of important data by changing the fill color of the cells within the row. Thus, the row with the changed background color stands out visually from the other rows of data.

Users also organize their data into more meaningful arrangements. For instance, a user may want the ten most important rows of data to be shown at the top of the spreadsheet. To help users organize their data, spreadsheet applications generally provide a suite of operations to organize the data. For example, many spreadsheet applications provide operations to filter or sort the user's data. To use the operations, the user generally inputs a selection of data to organize and a type of organization (i.e. filter or sort). Some of the operations require other parameters. For example, what data value should be filtered out of the data. The organization operations are very powerful tools that allow the user to quickly and automatically organize their data in a more usable arrangement.

Unfortunately, the organization operations generally operate only on data. Thus, the user can only organize the data if it is text or numbers. The user may have numerous portions of data highlighted by some format, such as row color. However, the user cannot then organize the data by those formats except by manually moving each piece of data themselves. Users either move the highlighted data manually, which is time consuming, or simply do not organize the formatted data, which limits the user to scrolling through all the data to find the highlighted portions. It is with respect to these consideration and others that the present invention has been made.

SUMMARY OF THE INVENTION

The present invention provides an automatic operation for organizing data by the format of the data within data applications. Organizing the data comprises any type of rearrangement of the display of the data. Exemplary embodiments of organizing data comprise filtering or sorting operations. The formats comprise any type of visual characteristic of the data. Exemplary embodiments of the formats include the fill color of a cell within a data application, the font color of data within a cell, or a type of icon placed within the cell. The present invention is not limited to the embodiments for organizing the data or the formats used to organize the data that are specifically described herein.

In one embodiment of the present invention, a user interface for creating an organization by a format is provided. The user interface displays a control to organize the data selection by a type of organization. The control could be a button, menu item, or other user interface control. The type of organization may be a sort, filter, or other type of organization. The user interface receives a selection of the control. In one embodiment, a user selects the control by actuating a user selection device on the control. In response to the selection of the control, the user interface displays a menu with one or more menu items. The menu items provide selections for how to organize the data by the type of organization and one or more formats. For example, the menu items provide a selection to sort the data by placing all cells with the cell fill color of red on the top of the data.

In another embodiment of a user interface, the user interface receives the focus on a data selection. The focus is a user interface display where a cell, set of cells, or other device within the user interface is displayed with a visual cue showing that the user selected the device. For example, in some embodiments, the data application places a border around a range of cells selected by the user. The data application displays the organization state for the cells with the focus. The organization state is a previously completed organization that was accomplished on one or more portions of the selected data. In some embodiments, the organization state is displayed as a tool tip, which is a pop-up window having a statement contained within the window. In embodiments, the window looks like a conversation bubble.

In still another embodiment of a user interface, the user interface displays a window. The window is a dialog, which receives a data selection in a dialog box within the window. The window also receives a selection of organization by a type of format in a first control box and receives a selection of the format in a second control box. The organization operation completes the organization according to the inputs received in the window.

Still another embodiment of a user interface receives a selection for an organization by a format. The user interface displays the organization by format and receives a second organization by format. The user interface displays both the first and second organization. The organization operation is completed according to both of the organization selections. Thus, a user, in the present invention, can enter more than one organization by format.

An embodiment of a method for organizing items of formatted data displayed in a data application is also provided. The data application receives a selection of data to organize and receives a selection of a format by which to organize the selection of data. The selected data within the data application is organized according to the selection of format.

Another embodiment of a method for organizing items of formatted data displayed in a data application comprises the data application receiving a selection of an active cell. The active cell is the cell within the data application with the focus. The data application displays a control to organize a selection of data by a format applied to the active cell and receives a selection of the control. The data application then organizes the selected data according to the format applied to the active cell.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently exemplary embodiments of the invention, and to the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 is another embodiment of a user interface illustrating how a user interacts with the spreadsheet application to organize data by a format according to the present invention.

DETAILED DESCRIPTION OF THE INVENTION

The present invention will now be described more fully hereinafter with reference to the accompanying drawings, in which embodiments of the invention are shown. The invention may however, be embodied in many different forms and should not be construed as limited to the embodiments set forth herein. Rather, these embodiments are provided so that the disclosure is thorough and complete and will fully convey the scope of the invention to those skilled in the art.

Generally, the present invention relates to changing, by the formats applied to the data, the organization, arrangement, or configuration of the displayed data. The present invention applies to any data application that stores data and can organize or arrange that data using operations. Data applications may include, but are not limited to, database applications or spreadsheet applications. An exemplary database application is the Microsoft® Access database application by Microsoft® Corporation. An exemplary spreadsheet application is the Microsoft® Excel spreadsheet application provided by Microsoft® Corporation. The present invention is explained as being embodied in a spreadsheet application. However, the present invention is not limited to the embodiments described hereinafter, but one skilled in the art will recognize the applicability of the present invention to other data applications.

Organizing or configuring the data is the process of arranging the displayed data within the spreadsheet. For instance, organizing the data includes, but is not limited to, sorting or filtering the data. The present invention is explained using filtering and sorting as exemplary embodiments of organizing the data. However, the present invention is not limited to the embodiments described hereinafter, but one skilled in the art will recognize the applicability of the present invention to other processes of organizing the data. In addition, many of the embodiments are described as operating on only columns or only rows. However, one skilled in the art will recognize that many of the data organization operations operate on columns, rows, or both columns and rows.

Formats are any visual characteristic of the data besides the data's value. Thus, formats include, but are not limited to, fill color, fill pattern, fill transparency, cell icon, font color, font type, font characteristics such as italics, bold, and underline, cell border type, cell border thickness, or cell border color. The present invention is described herein using only a few of the possible format types. One skilled in the art will recognize that the present invention applies to those types of formatting listed above and other types of formatting known in the art.

Figure 1A:
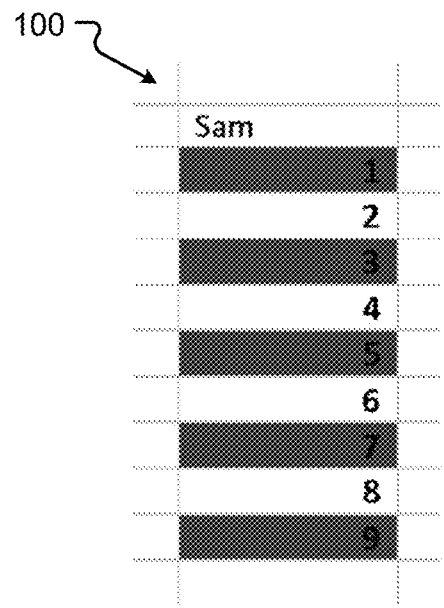
FIG. 1A, FIG. 1B, FIG. 1C, and FIG. 1D are embodiments of a spreadsheet application having aspects of the present invention illustrating an organization by a format according to the present invention.
Figure 1B:
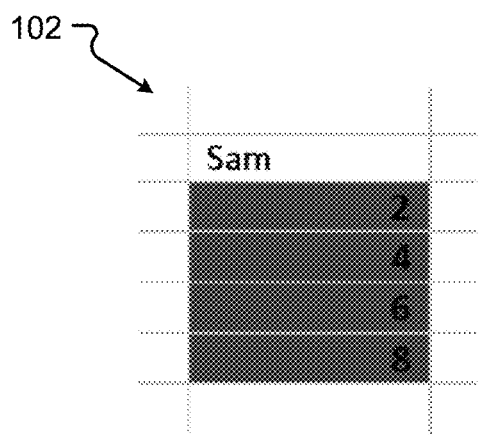
Figure 1C:
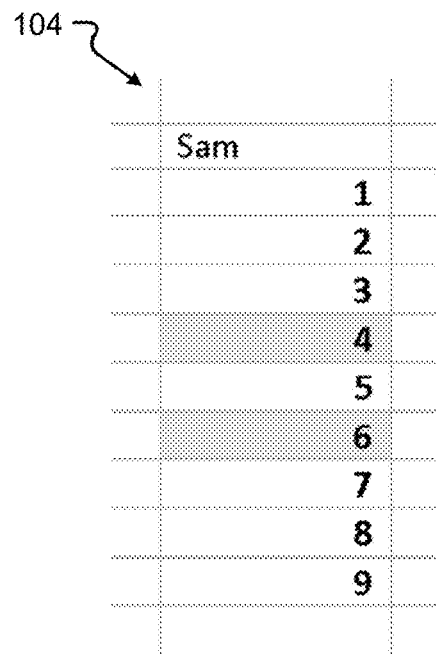
Figure 1D:
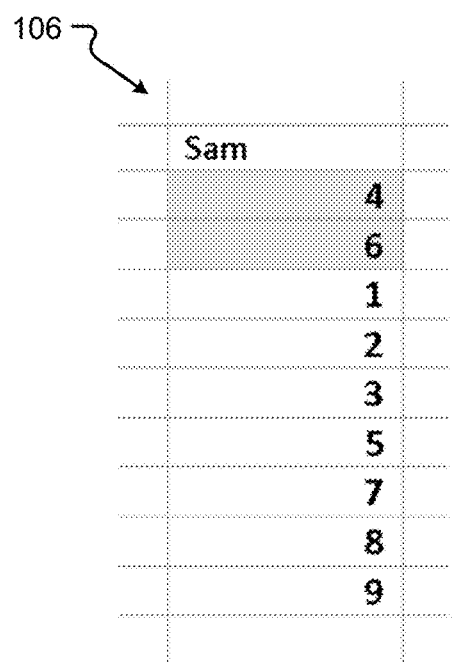

Exemplary embodiments of the present invention are shown in FIG. 1A, FIG. 1B, FIG. 1C, and FIG. 1D. In FIG. 1A and FIG. 1C, a column of data is shown as is typical in spreadsheet applications. The exemplary columns of data have ten cells (except FIG. 1B, which only depicts five cells), one cell with the data header "Sam" and nine cells of data. Some of the cells within each column of data have a different fill color, red in FIG. 1A and yellow in FIG. 1C. In the present invention, the user can reorganize or configure the data using the cell formats. Thus, in one embodiment, a user filters the cells of data in column 100 according to the fill color red. The spreadsheet returns a filtered column of data 102 displaying only those cells whose fill color is red. In another embodiment, the user sorts the cells of data in column 104 according to the fill color yellow. The user requests that any cell having a yellow fill color be placed at the top of the column. The spreadsheet returns a sorted column of data 106 displaying two cells having the yellow fill color occupying the top two cells.

Figure 2:
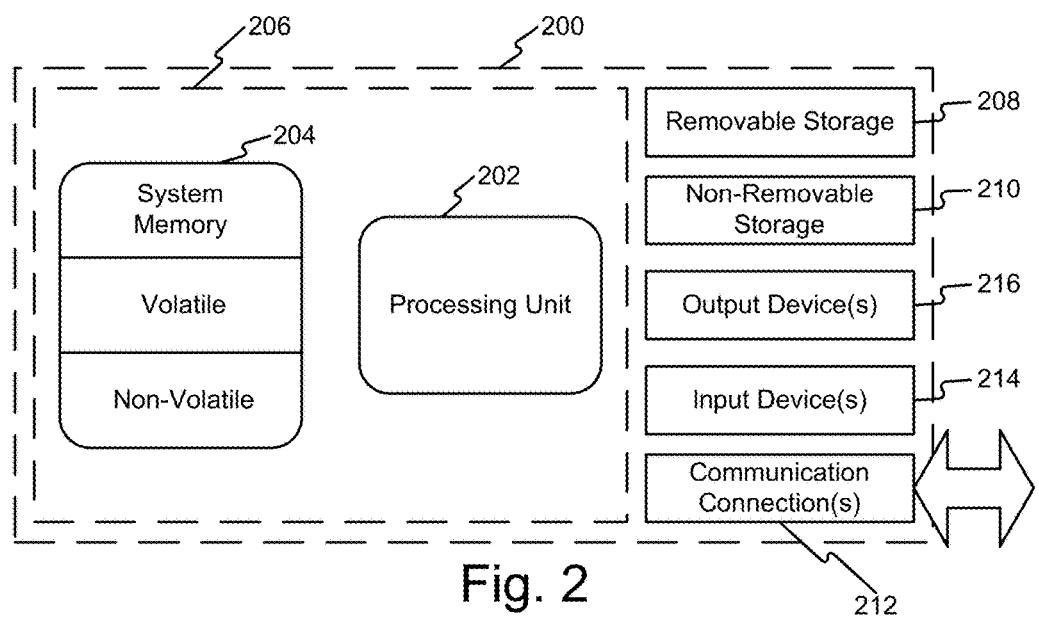
FIG. 2 is a functional diagram illustrating a computing environment and a basic computing device that can operate the graphics creation system according to the present invention.

An embodiment of a suitable operating environment in which the present invention may be implemented is shown in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary computing environment for implementing the embodiments of the present invention includes a computing device, such as computing device 200. In its most basic configuration, computing device 200 typically includes at least one processing unit 202 and memory 204. Depending on the exact configuration and type of computing device 200, memory 204 may be volatile (such as RAM), non-volatile (such as ROM, flash memory, etc.), or some combination of the two. This most basic configuration of the computing device 200 is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Such computer storage media includes volatile and nonvolatile, removable and non-removable media implemented in any method or technology for storage of information such as computer readable instructions, data structures, program modules, or other data. Memory 204, removable storage 208, and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which can be used to store the desired information and which can be accessed by device 200 and processor 202. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. These devices, either individually or in combination can form the user interface 102. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

A spreadsheet application stores and arranges data in a spreadsheet. A spreadsheet comprises a series of rows and a series of columns. The intersecting rows and columns form cells. The cells contain items of information. The information comprises data, text, error values, formulas, and other types of information. In addition, a cell or the data within the cell can be formatted. The formats include, but are not limited to, fill color, fill pattern, fill transparency, cell icon, font color, font type, font characteristics such as italics, bold, and underline, cell border type, cell border thickness, or cell border color. An active cell is the cell with the focus. The focus is displayed when a cell or cells are selected. In one embodiment, the focus is a different border around the cell or cells designating that the cell or cells is selected.

Figure 14:
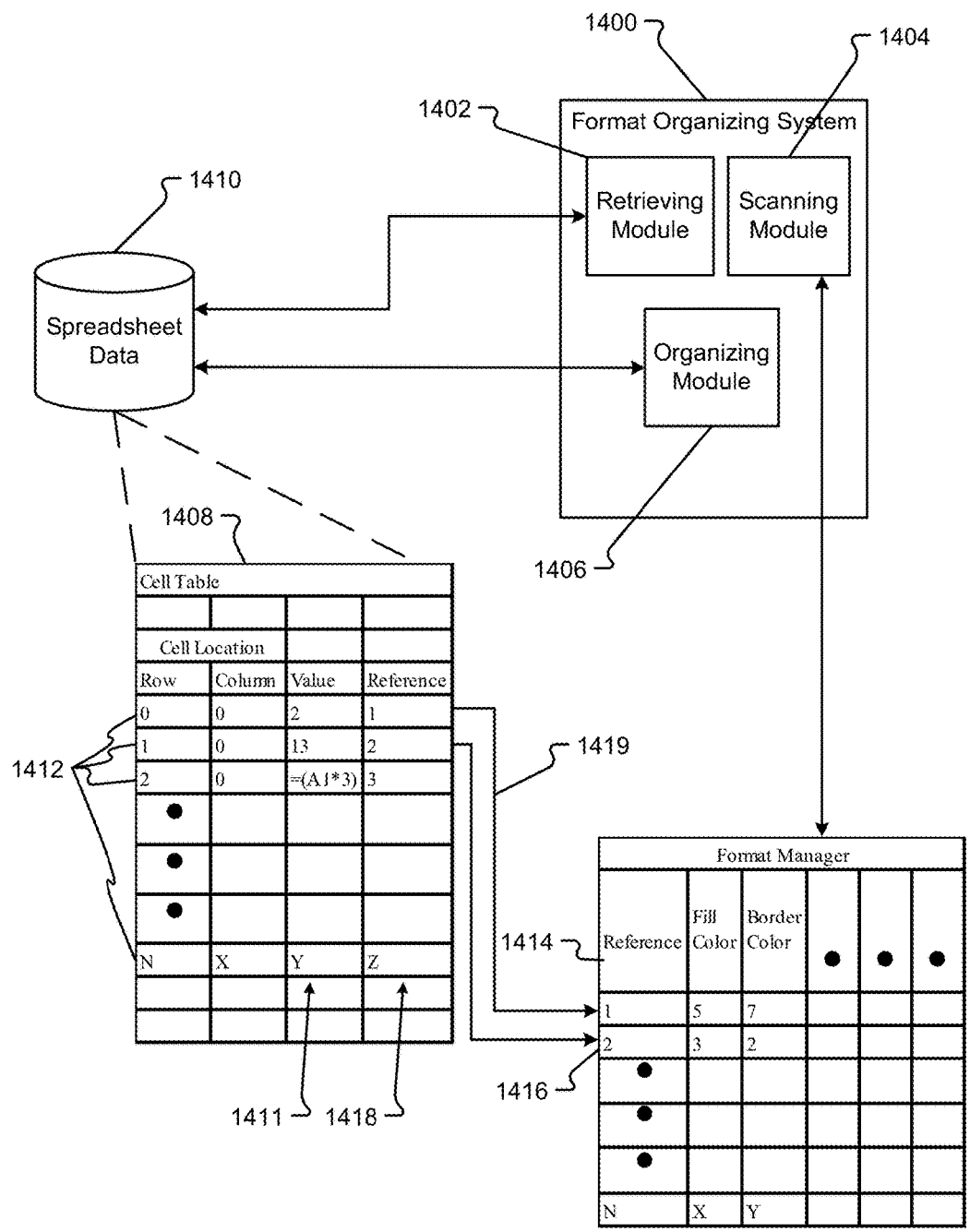
FIG. 14 shows an embodiment of a format organizing system for organizing data cells in a spreadsheet.

An exemplary embodiment of a format organizing system 1400 according to aspects of the present invention is shown in FIG. 14. The format organizing system 1400 comprises a retrieving module 1402 that receives a user selection of data. The retrieving module 1402 accesses a cell table 1408 stored within a spreadsheet data store 1410. The cell table 1408 comprises a plurality of cell entries 1412. The cell entries 1412 comprise information about the cells within the spreadsheet. In one embodiment, each cell entry 1412 has a location, such as (0,0), which represents cell A1, (1,0) which represents cell A2, and so on, that represents the cell's row location and column location. The cell location functions as an identifier and a pointer to the cell within the spreadsheet. In another embodiment, every cell within a spreadsheet has a unique identification number (ID). The cell entries identify the cells in the displayed spreadsheet by the ID. Along with the cell location, each cell entry 1412 has a value 1411. The value can be a number, text, formula, reference, or other information about the cell. In some embodiments, the cell table 1408 contains formatting information, and in other embodiments, the cell table 1408 contains a reference value 1418. As shown by arrows 1419, the reference values 1418 refer to a format manager entry 1416 in a format manager 1414 containing formatting information. In one embodiment, the retrieving module 1402 finds the cells within the cell table 1408 by the location information in the cell entry 1412. For instance, if the user selects cell A1, then the retrieving module 1402 locates the cell (0,0) in the cell table for the cell having the location of A1. The references or index to the information in the format manager for all the cells in the data selection are returned to the scanning module 1404.

In one embodiment, the retrieving module retrieves the formats from the format manager 1414 to use for format selections in the user interface display. For example, the format manager 1414 has entries 1416 for one or more references. One or more cells may share a reference. The format entries 1416 include entries for numerous types of formats, such as fill color, border color, font color, etc. In one embodiment, the format manager 1414 also includes one or more entries for conditional formatting. Conditional formatting is a user-established format for one or more cells that meet user-established criteria. For example, a range of cells may have a color gradient, such as the cells shown in FIG. 8C described below. The selections in the menu are established from the formats found in the format manager 1414. Thus, a conditional format may also produce one or more conditional format selections as explained with FIG. 8F.

The scanning module 1404 accesses the format manager 1414. In one embodiment, the format manager 1414 is separate table. The format manager comprises one or more entries 1416 that hold information about the formats applied to a cell, such as fill color, border color, font color, conditional formatting, etc. In one embodiment, each cell entry 1412 in the cell table 108 contains an index or references to an entry 1416 in the format manager 141. In other embodiments, one or more cell entries 1412 in the cell table contain the same reference or index to the same format entry 1416 in the format manager 1414. The scanning module 1404 receives the type of format to be used in the organization, such as fill color. The scanning module 1404 scans the format manager 1414 for each cell location returned by the retrieving module 1402. The scanning module then scans the entry for the selected type of format. If the selected format is the same as the format listed in the format manager 1414, the scanning module returns the cell location to the organizing module 1406.

The organizing module 1406 organizes the selected data. In one embodiment, the organizing module receives the selection for type of organization, such as a filter or a sort, and receives the cell locations returned by the scanning module. The organizing module organizes the returned cells according to the selected organization type. In one embodiment, the organizing module 1406 rewrites information in the cell table 1408. The information in the cell table 1408 is switched. For example, the value and reference information for cell location (0,0) is swapped with the value and reference information for cell location (0,1). In another embodiment, cell identifiers identify the cells, and the cell entries 1412 contain cell location information. The cell location information is rewritten for the particular cell identifiers. For example, a first cell with identifier 0001 has its location information changed to (0,2), while a second cell with identifier 0003 has its location information changed to (0,0). One skilled in the art will recognize other methods by which the organizing module can organize the data by the returned cell locations.

Figure 3A:
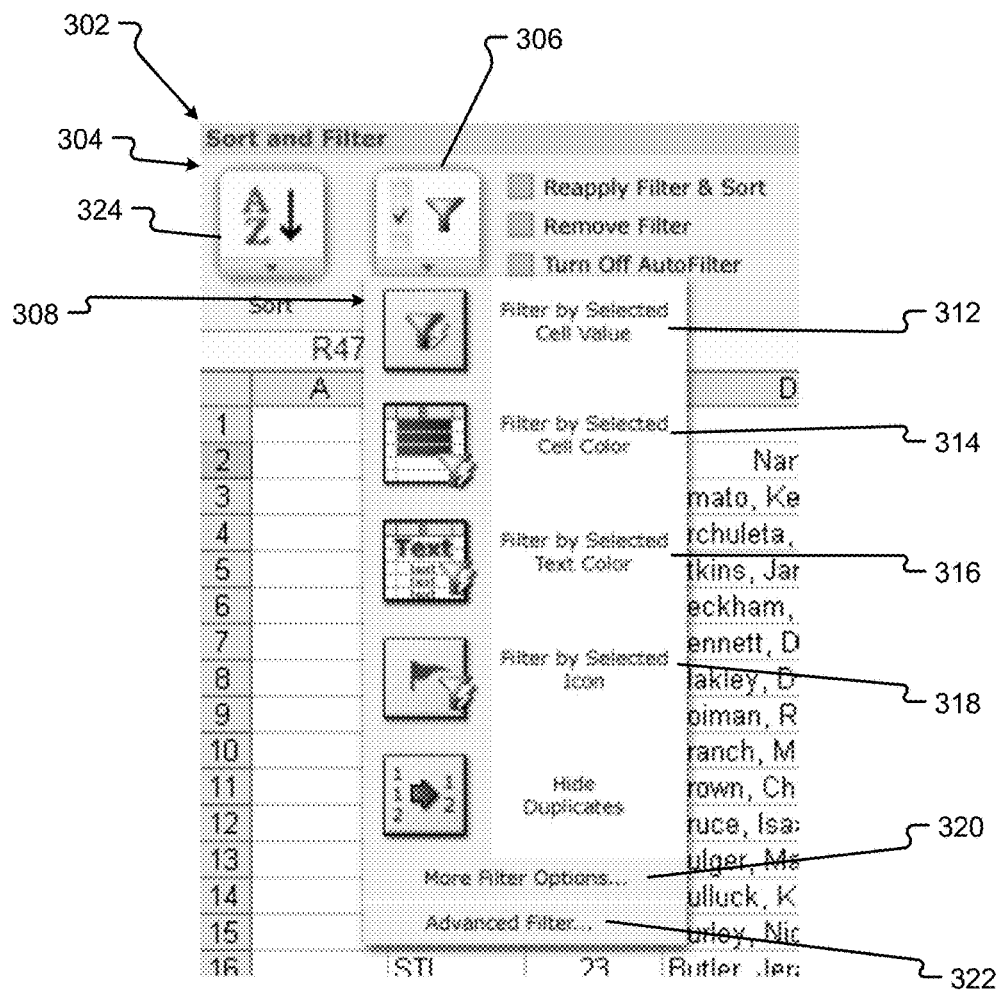
FIG. 3A and FIG. 3B are embodiments of a user interface illustrating how a user interacts with the spreadsheet application to organize data by a format according to the present invention.
Figure 3B:
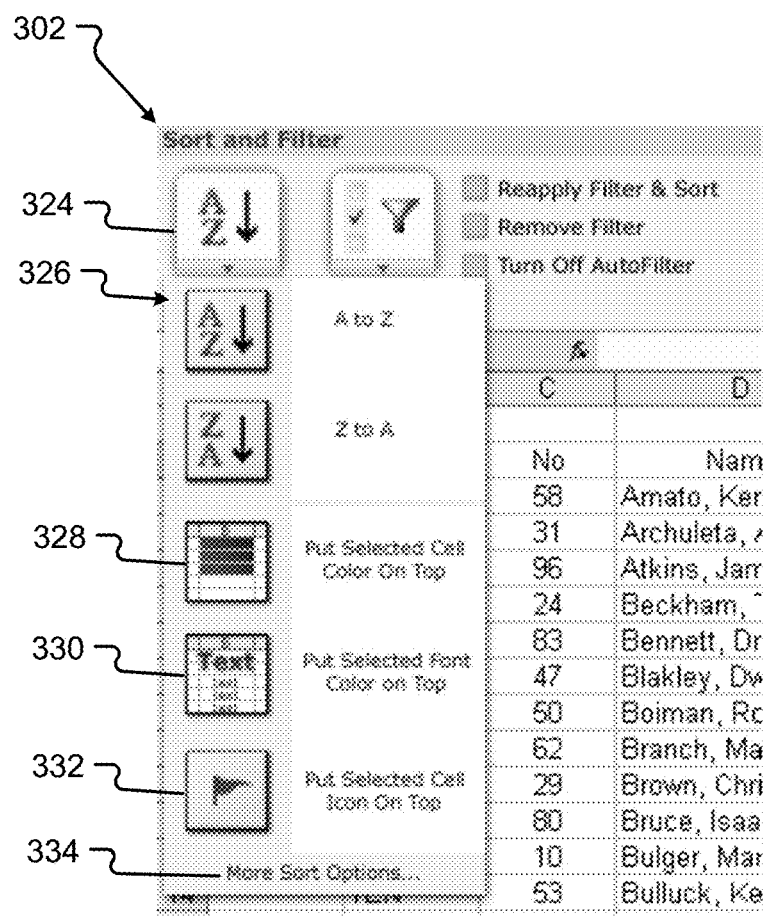

In embodiments of the present invention, the spreadsheet application comprises one or more user interfaces 302, as shown in FIG. 3A and FIG. 3B. A user interface can be a dialog window, a menubar, a control, a toolbar, or other devices either to display information or receive input from the user. In one embodiment, one of the user interfaces is toolbar 304. While a toolbar 304 is described hereinafter, one skilled in the art will recognize that the functions within the toolbar 304 may be embodied in other types of user interfaces. In one embodiment, the toolbar 304 comprises one or more controls, such as control 306. A control is a device, in the user interface, that, when selected by a user selection device, can execute an operation or other function. An example of a control is a button, such as button 306 in FIG. 3A. In the exemplary embodiment, the control 306 represents a type of organization: filtering. Control button 324 represents sorting. One skilled in the art will recognize that there may be fewer or more types of organizations represented by fewer or more controls.

Upon selecting the control 306, the spreadsheet application provides a menu 308 of different types of filtering. A menu is a list of selectable menu items that, when selected, execute operations or functions of the spreadsheet or displays further submenus. The menu 308, of the present embodiment, provides several menu items, such as menu item 312, from which to select. The present invention provides menu items that organize the data by a format. For instance, menu items 314, 316, and 318 all provide operations for filtering by a certain format. Upon selecting menu item 314, the spreadsheet application filters the data selection according to the cell color. For example, if the active cell's color is red, only those cells also having a cell color of red is displayed and all other cells are hidden, as shown in FIG. 1A and FIG. 1B. Selecting menu item 316 executes a similar operation that filters the data according to the color of the text in the active cell. Similarly, upon selecting menu item 318, the spreadsheet filters the data according to the icon in the active cell. Menu items 320 for "More Filter Options" and 322 for "Advanced Filter" open further user interfaces that are explained in more detail below.

Upon selecting the button 324 for sorting operations, menu 326 is displayed. The menu 326 also comprises one or more menu items related to the sorting operation. Some of those menu items represent operations that sort by format, such as menu items 328, 330, and 332. Upon selecting menu item 328, the spreadsheet application sorts the selected data by the cell color of the active cell. In the present embodiment, cells with the cell color of the active cell are moved to the top of the spreadsheet. Similarly, selecting menu item 330 moves or causes repositioning of all cells to the top of the spreadsheet that have a text color the same as the active cell. Selecting menu item 332 causes placement of all cells at the top of the spreadsheet that contain the same icon as the active cell. Menu item 334 provides a further user interface for more sort options, which is explained in more detail below.

Figure 4A:
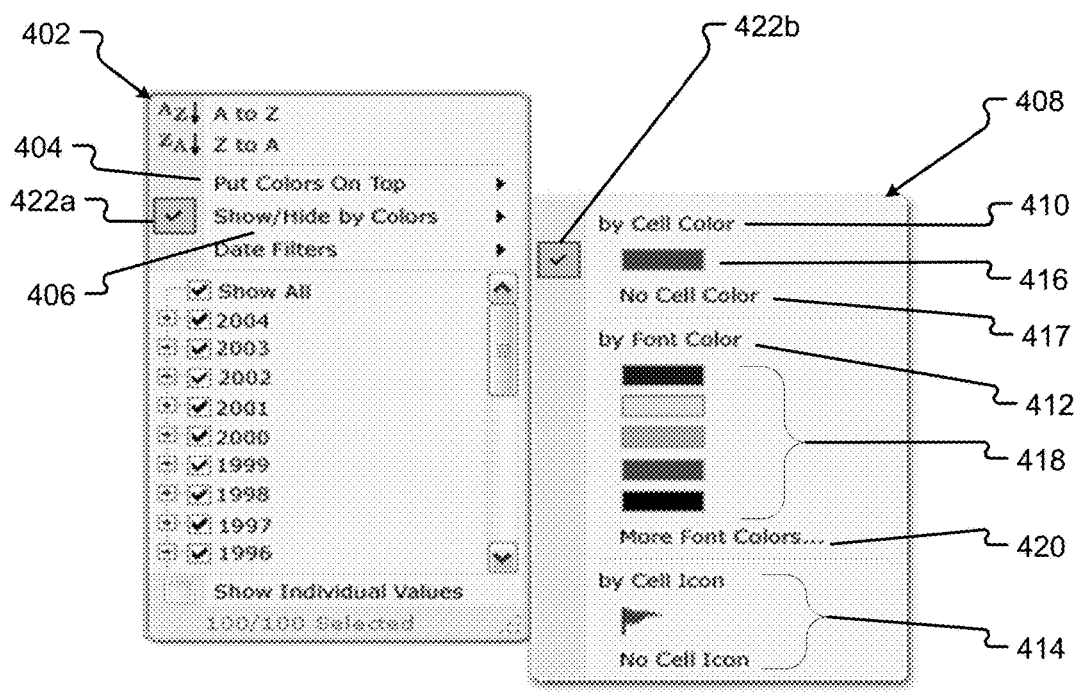
FIG. 4A and FIG. 4B are other embodiments of a user interface illustrating how a user interacts with the spreadsheet application to organize data by a format according to the present invention.
Figure 4B:
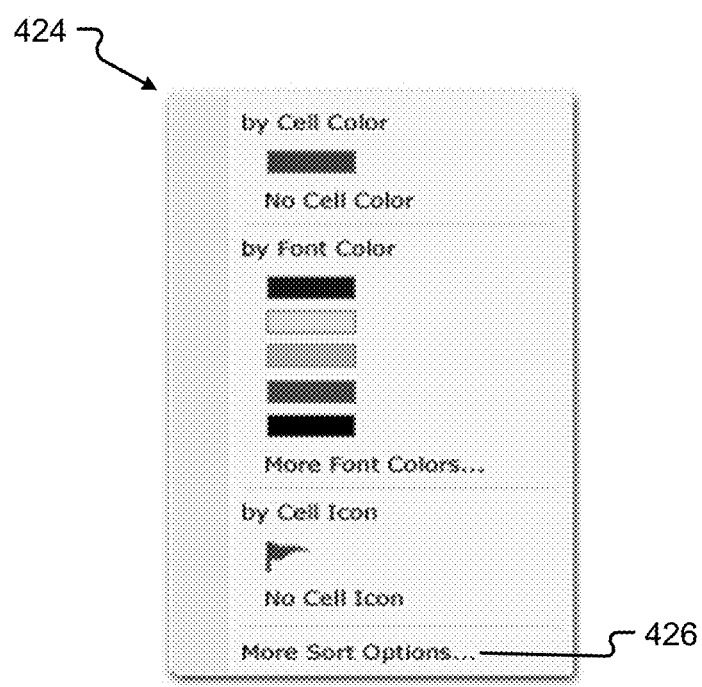

Other embodiments of a user interface for selecting operations to organize data by a format are shown in FIG. 4A and FIG. 4B. A menu 402 is displayed upon selection of some control, such as control 324. In one embodiment, the menu is displayed after selecting an Autofilter button. Autofilter is explained in more detail below. In another embodiment, the menu is displayed after the user selects a control in a menubar that has a selection for organization by format. The menu 402 comprises one or more menu items, such as menu item 404. One or more of the menu items comprise selections for types of organization by format. For example, menu item 404 represents sorting by a format, specifically color. Menu item 406 represents filtering by a format, specifically color. In one embodiment, upon selecting menu item 406, menu 408 is displayed. Menu 408 provides selections to execute filtering operations according to specific formats. In another embodiment, upon selecting menu item 404, menu 424 is displayed. Menu 424 provides selections to execute sorting operations that are specific to certain formats. Menu 408 and menu 424 operate similarly and therefore only menu 408 is explained in detail. One skilled in the art will recognize how the similar menu components will operate with the sorting menu 424.

Menu 408 comprises one or more menu items. In one embodiment, the menu items are arranged into categories within the menu according to a type of format, such as cell color 410, font color 412, or cell icon type 414. In a further embodiment, one or more selections of formats are provided in each category. For example, in the font color category 412, several selections 418 for color are provided. By choosing one of the color choices 418, the spreadsheet application filters the selected data according to that color. Each category may have different or similar selections for format. For example, cell color provides only one selection 416 by which to filter. In some embodiments, the user may filter the data selection according to the absence of color, as is evidenced by the selection 417 for "No Cell Color."

In some embodiments, the menu 408 or 424 provides a selection, such as selection 420, to open a menu or dialog for more options, such as colors. In one embodiment, the categories for format type, 410, 412, and 414, only display a set number of colors. For example, the font color category 412 only displays five colors as evidenced by the five color choices 418. Minimizing the number of color selections reduces clutter in the menu and provides a more pleasing interface for the user. However, if the number of color choices is more than can be displayed, then the menu 408 provides a selection for more colors 420.

In one embodiment, the spreadsheet program determines the format choices. The spreadsheet program scans the cell table, such as cell table 1408, for the cell entries, such as cell entry 1412, having a cell location within the data selection. Upon finding the cell entries with the particular cell locations, the spreadsheet determines and stores a list of references or indexes, such as index 1418, to the format manager, such as format manager 1414. Each format manager entry, such as format entry 1416, may include one or more formatting settings. In one embodiment, the format entry has a fill color setting for the cell or cells. The formats are retrieved and stored in an array. Once all the formats are stored in the array, the spreadsheet provides the formats to the menu 408 for rendering. If there are more formats in the array than the set number of formats presented in the menu 408, the more formats option, such as option 420, is also rendered. If the user chooses the more formats option, the spreadsheet provides all of or the remainder of the formats in the array to a next menu for rendering. Thus, the menu 408 only displays formats actually used in the data selection.

In another embodiment, the user is limited to the number of formats that can be used to format the cells. In this specific embodiment, the limited set of formats is always displayed in the menu 408. Thus, the user can quickly distinguish which formats may be used in the data selection and choose that format from the limited set of format choices. In another embodiment, all available formats are provided in the menu, and the user selects from the list of formats.

Another embodiment of the present invention provides an organization state in a format organization menu, such as control 422a and 422b in menu 402 and 408 respectively. The organization state is a state of at least a portion of the data selection. Once a user organizes a selection of data, the selected data receives an organization state. An organization state is the description of how the data is currently organized. For instance, if the data is filtered, the organization state shows that the data has been filtered previously. The organization state may be provided to the user in different ways. In the exemplary embodiment shown in FIG. 4A, an icon 422a demonstrates that at least a portion of the data has been organized previously. In this example, the data was previously filtered, and thus, some parts of the data are hidden. Menu 408 displays a second icon 422b that further delineates the type of filter previously applied to the data. In this example, at least a portion of the data was filtered according to a red cell color. The organization state can be shown for any type of organization provided in the menus. The icon 422a or 422 b is a check mark, but may be any kind of visual cue that the data was previously organized. More embodiments of the organization state are discussed below.

Figure 5:
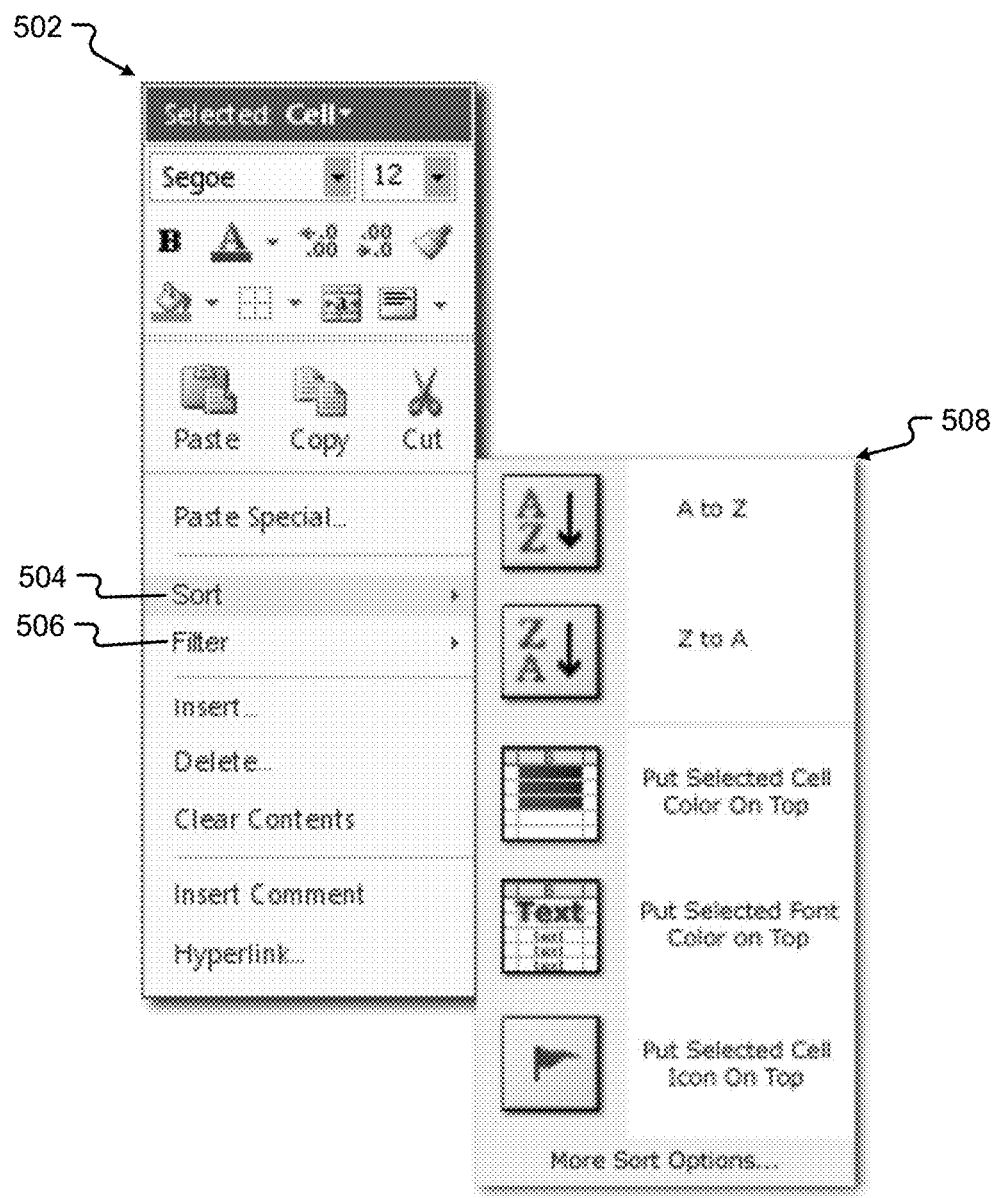
FIG. 5 is another embodiment of a user interface illustrating how a user interacts with the spreadsheet application to organize data by a format according to the present invention.

Another embodiment of a dialog window 502 to access the organizations by formats is shown in FIG. 5. The dialog window 502 is provided upon a selection to edit a cell within the spreadsheet. For example, if a user right-clicks on a cell in the spreadsheet, the dialog window 502 is displayed. The dialog window 502 provides menu items for types of organizations. In the present embodiment, the dialog window 502 provides a menu item 504 for sorts, which is highlighted and selected, and a menu item 506 for filters. If the menu item 504 for sorts is chosen, another menu 508 for format type is displayed. The menu 508 is similar to the menu 326 presented in FIG. 3B and will not be explained further. If menu item 506 for filters is chosen, a menu similar to the menu 308, as shown in FIG. 3A, is displayed.

An exemplary portion of a spreadsheet 602 with the Autofilter option initiated is shown in FIG. 6. Autofilter is an operation that places the control boxes 606 into the column headers in the column header row 604. The Autofilter option provides quick access to filter operations in the spreadsheet. In addition, using the Autofilter operations by selecting the control box 606 applies the organization operation to the data in the column 607 having the selected control box 606. Embodiments of the present invention provide the menus described above with the organizations by formats when selecting an Autofilter control box 606. In addition, in some embodiments, the Autofilter control boxes in the present invention provide a visual cue of the organization state. For instance, control box 608 displays a filter icon. Thus, a filter operation has been applied to the column. Control box 610 displays an arrow icon demonstrating that a sort operation has been applied to the column. Finally, control box 612 shows a filter icon and an arrow icon demonstrating that both a filter operation and a sort operation were applied to the column. One skilled in the art will recognize other icons that can signify other organization states. For example, the icon could include a colored arrow signifying that the sort was according to the arrow color and that the cells with that color were placed at the bottom or top of the table. In another embodiment, the filter icon may have a color signifying that the filter was according to the color of the filter icon. In still another embodiment, the arrow icon may have two colors representing that one color was placed above or below another color.

Figure 7:
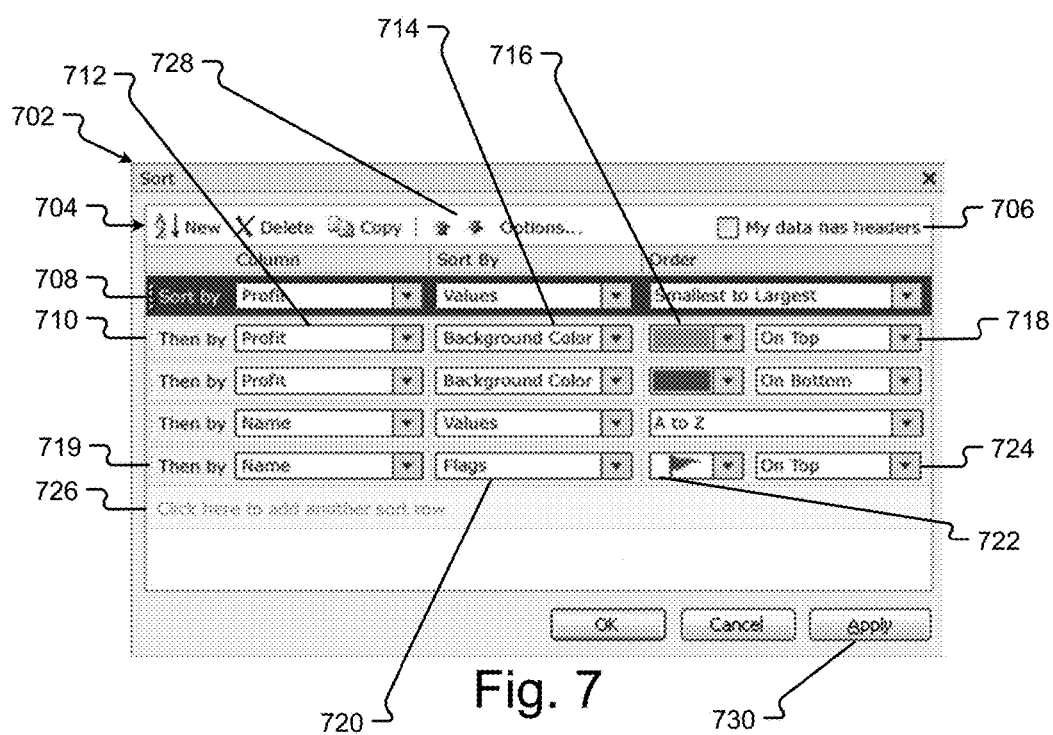
FIG. 7 is another embodiment of a user interface illustrating how a user interacts with the spreadsheet application to organize data by a format according to the present invention.

A dialog window 702 allowing the entry of a plurality of organizations by format is shown in FIG. 7. Many of the menus and user interfaces described above may only allow the selection of a single organization by format. The dialog window 702 is displayed when the "more organization options," such as the more sort options selection 426 in FIG. 4B, is chosen. While the dialog window 702 is specific to sort options, one skilled in the art will recognize that this type of dialog window, with similar options and features, can be created for other types of organizations, such as filtering.

The window 702 provides, in one embodiment, a toolbar 704 with a set of controls for common user functions, such as a simple sort, a delete, or a copy. In one embodiment, the user can select one control 706 to designate that the selected data has data headers. The control 706 informs the dialog window 702 to provide data headers in the choices within the dialog boxes described hereinafter.

The dialog window 702 provides a set of organization definitions in one or more rows within the window 702. A first organization definition 708 displays the type of organization, a sort in the exemplary embodiment, that is being executed on the selected data. The organization definition is organized into a series of control or dialog boxes where the user enters the parameters for each organization. Row 710 displays an organization by a format. The user enters, into a first control box 712, the column of data that contains the data to be reviewed for the organization. The sort is applied to all the data within the spreadsheet but each row of data is sorted according to the formats within the selected column of data. The control box 712 provides the column headers. If the user selects the control 706 for data headers, the spreadsheet is scanned for data headers in the columns. The data headers are stored and displayed in the control box 712. In another embodiment, the data headers are displayed automatically even if the control 706 is not selected or provided.

A second control box 714 provides the different types of formats or other values that the operation can use to sort the data. In the exemplary embodiment, the background color of the cells, or the fill color, is chosen in control box 714. A third control box 716 further delineates the type of format that was selected in control box 714. For example, if cell fill color was chosen in control box 714, then control box 716 displays a set of cell fill colors used with the cells in the data selection designated in control box 712. The exemplary embodiment shows that the color green was selected. Finally, control box 718 provides a set of selections for how to sort by the particular color. For example, the selections comprise putting the rows with the cells of a green color on the top or on the bottom. The exemplary embodiment shows that the rows are to be placed on top of the table according to the selection in control box 718. One skilled in the art will recognize other options that can be displayed within the scope of the present invention.

In another exemplary embodiment shown in row 719, the user chose to sort the data by the flag icon in the cells as shown in control box 720. The user chose, in control box 722, to sort by the red flag. The rows with the red flag in the designated cells are to be placed on top of the table, as designated by the selection in control box 724. The user selects to add organization definitions by selecting another control, such as control 726. The organization operation is conducted in the order that the definitions are displayed in the window 702. Thus, the sort occurs first according to the definition in row 708 then row 710 and so on. To change the order of operation the user moves the definitions within the window. In one embodiment, the user selects a row with a user selection device, such as a mouse, and drags and drops the row in the proper order. In another embodiment, the user can highlight a row, such as row 708 is highlighted, and use the order controls 728 provided in the toolbar 704 to reorder the sorts. Once the user is satisfied with the collection of organization definitions, the user can select one of the navigation buttons 730, such as the "Apply" or "OK" buttons to apply the set of organizations to the data.

Exemplary portions of spreadsheets and related user interfaces are presented in FIG. 8A, FIG. 8B FIG. 8C FIG. 8D, FIG. 8E, and FIG. 8F. In one embodiment, an exemplary portion of spreadsheet data 802 has two cells 804a and 804b with a fill color of yellow. The user interface scans the table for formats. The yellow cell fill color is found and provided in the cell color control box menu 806. Menu 806 is a menu similar to a menu displayed if a user selects control box 716 in FIG. 7. However, a similar display may be provided in any of the user interfaces described above. The menu 806 provides two selections, a selection 808 for no cell color and a selection 810 for the yellow cell color. If the user chooses a yellow cell color, the data in the spreadsheet 802 is organized according to that color. If the user were filtering, the resulting display would hide or not show cells without yellow, similar to the result in FIG. 1B (when non-red cells were hidden). If the user were sorting, the result would look like the result shown in FIG. 1D.

Figure 8A:
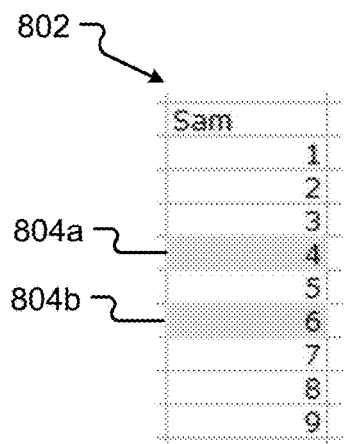
FIG. 8A, FIG. 8B, FIG. 8C, FIG. 8D, FIG. 8E, and FIG. 8F illustrate other embodiments of spreadsheets and related user interfaces illustrating how a spreadsheet application having other aspects of the present invention provides selections of formats to a user in the present invention.
Figure 8B:
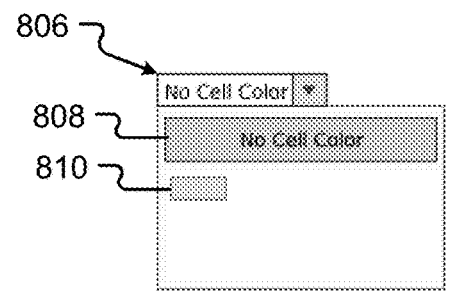
Figure 8C:
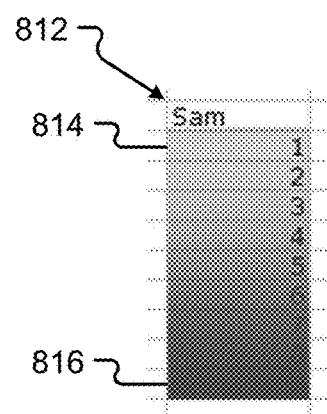
Figure 8D:
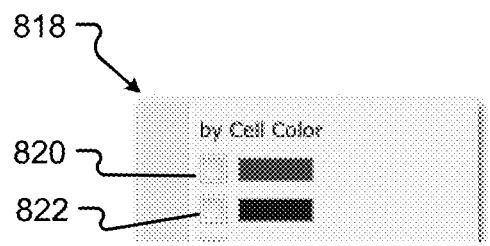

The user interface displays have further embodiments that adjust to how the user formats the data within the spreadsheet. Another embodiment of a portion of a spreadsheet 812 and a related user interface 818 is shown in FIG. 8C and FIG. 8D. The data within spreadsheet 812 has a color gradient applied to the data. The color gradient starts at cell 814 where the color of the cell is mostly blue. The color gradient ends at cell 816 where the color is mostly red. The gradient formatting requires the organization menus to display the color choices differently. A menu 818, similar to the menus in previously described user interfaces, is shown if a filter is desired. Unfortunately, the gradient cell color displays several shades of colors from blue to red that the spreadsheet 812 may use to filter. To address the issue, the menu 818 displays the two primary colors red and blue, as a first selection 820 and a second selection 822, respectively. If one color is chosen, only those are hidden cells where the shade of cell fill color of the cell is less than 50% of the selected color. In other words, if the user chooses to sort by red and if the cell has a shade of color comprising less than 50% red, i.e., it is bluer, then the bluer cell is hidden.

Figure 8E:
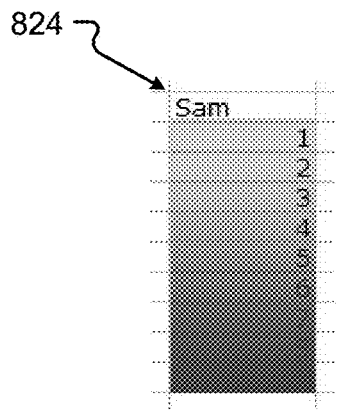
Figure 8F:
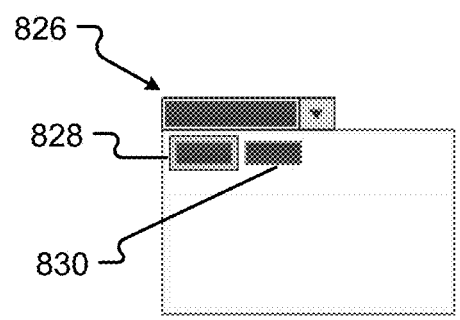

Another exemplary spreadsheet 824 and related user interface 826 address the gradient formatting for a sort operation as shown in FIG. 8E and FIG. 8F. Here, menu 826 provides two options for sorting by the gradient color. The first option 828 sorts the cells in the spreadsheet 824 from blue at the top to red at the bottom. The second selection 830 provides for sorting in the opposite order from the first selection 828. If the first option is selected, the cells are arranged from the bluest cell down to the reddest cell. Thus, the column of data 824 would appear as it is shown in FIG. 8E. If the second option 830 is selected, the column is shown from the reddest cell to the bluest cell, or would appear in the reverse of the current column 824. Since each cell has a format value based on color or percentage of color, then the value can be used to sort and/or filter the cell with respect to other cells.

Figure 9A:
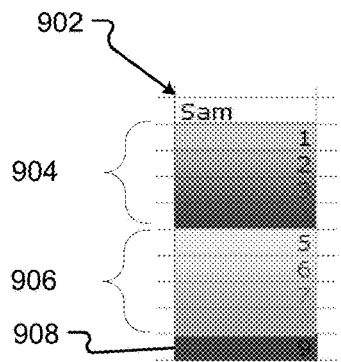
FIG. 9A, FIG. 9B, FIG. 9C, FIG. 9D, FIG. 9E, and FIG. 9F illustrate other embodiments of spreadsheets and related user interfaces illustrating how a spreadsheet application having other aspects of the present invention provides selections of formats to a user in the present invention.
Figure 9B:
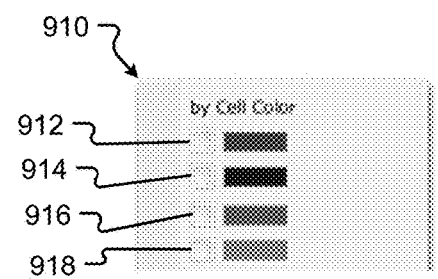

More embodiments of spreadsheets and related user interfaces addressing even more complicated formatting are shown in FIG. 9A, FIG. 9B FIG. 9C FIG. 9D, FIG. 9E, and FIG. 9F. Spreadsheet 902 comprises a section of data 904 with a gradient color formatting from blue to red, a section 906 of data with gradient color formatting from green to orange, and a cell 908 that is colored red. A filtering menu 910 is shown in FIG. 9B. The selections in menu 910 comprise the selections for the primary gradient colors and the color of the individual cell 908, which happens to be the same as one of the gradient colors. Thus, selection 912 is red, one of the gradient colors, selection 914 is blue, the other gradient color for section 904. Selection 916 is green, the first gradient color, and section 918 is orange, the second gradient color for section 906.

Figure 9C:
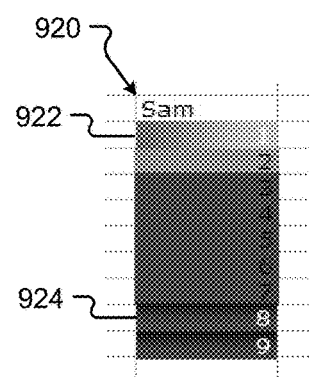
Figure 9D:
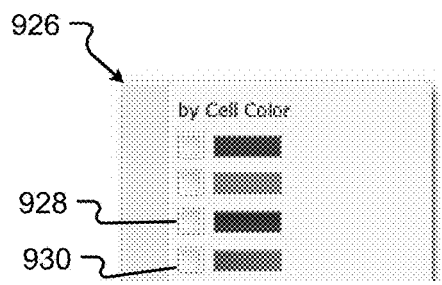

Another spreadsheet portion 920 and the related menu 926 are shown in FIG. 9C and FIG. 9D, respectively. In particular, spreadsheet 920 includes a first cell 922 with a single cell color gradient from green on the left to orange on the right. Format selection 930 represents, in the filter menu 926, the color arrangement for the single cell color gradient of cell 922. Cell 924 also has a single cell color gradient from blue on the top to red on the bottom. Menu item 928 represents, in the filter menu 928, the color arrangement for cell 924.

Figure 9E:
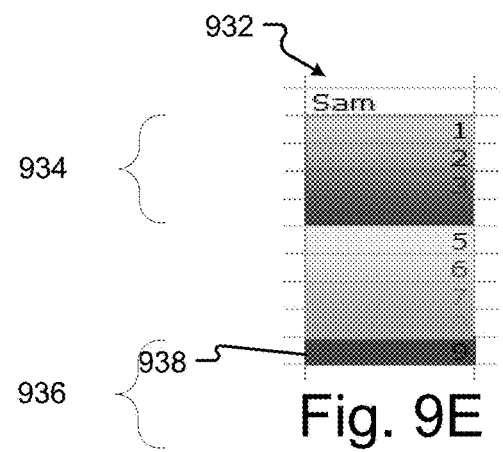
Figure 9F:
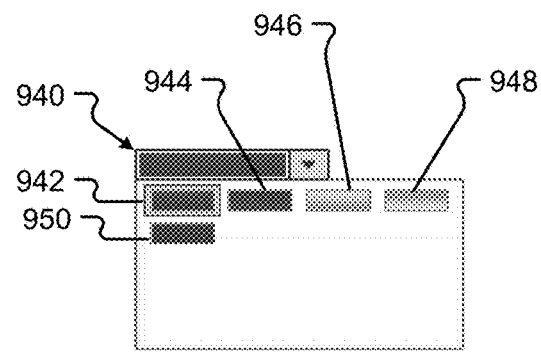

Another embodiment of a spreadsheet 932 and a related sort menu 940 are shown in FIG. 9E and FIG. 9F, respectively. Spreadsheet 932 has a first section 934 that is formatted with a color gradient from blue on the top to red on the bottom. Two selections 942 and 944 represent two sort states that affect the section 934. The first selection 942 sorts the data from blue on the top to red on the bottom. The other selection 944 sorts the data selection in the opposite direction. Section 936 has a color gradient from yellow to orange. Menu items 946 and 948 can sort the data according to the primary colors in section 936. Finally, a single cell 938 has a fill color of red. To sort cells with this color, selection 950 is provided in menu 940.

Figures 10A, 10B, 10C:
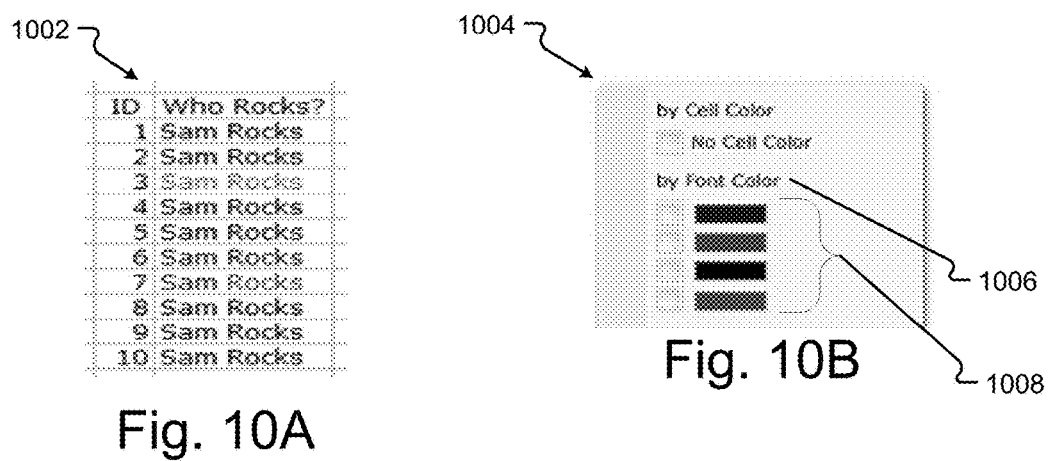
FIG. 10A, FIG. 10B, FIG. 10C, FIG. 10D, FIG. 10E, and FIG. 10F are embodiments of a spreadsheet before an organization operation, a related user interface, and a spreadsheet after an organization operation illustrating how a spreadsheet application having aspects of the present invention provides selections of formats to a user and organizes the data according to the user's input in the present invention.

A filter operation by font color is demonstrated in FIG. 10A, FIG. 10B, and FIG. 10C. A first display of the spreadsheet 1002 shows a column of data. Some of the data within the cells have different font colors, such as black, green, blue, and red. These different font colors are represented by menu selections 1008 under a font color category 1006 in menu 1004. Upon selecting the color blue, all cells without data with a font color of blue are hidden. The result is shown in the second display of the spreadsheet 1010. As is demonstrated, two cells are returned. The first cell has data with both a font color of red and blue, but is still returned because part of the data has a font color of blue.

Figures 10D, 10E, 10F:
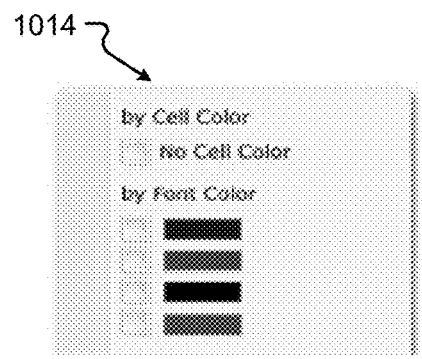

A sort operation by font color is demonstrated in FIG. 10D, FIG. 10E, and FIG. 10F. A spreadsheet 1012 is shown in FIG. 10D. Spreadsheet 1012 and 1002 are the same. A menu 1014 appears the same as menu 1004, except menu 1014 displays options for sorting rather than filtering. Upon selecting the color blue for font color, table 1016 is returned. Here, all cells having data with a font color of blue are set on top of the table.

Figure 11A:
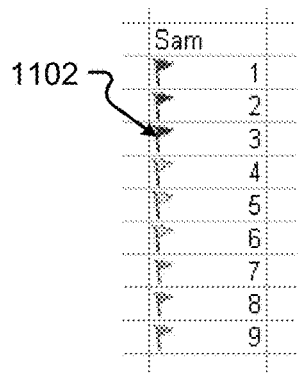
FIG. 11A, FIG. 11B, FIG. 11C, FIG. 11D, FIG. 11E, and FIG. 11F are embodiments of a spreadsheet before an organization operation, a related user interface, and a spreadsheet after an organization operation illustrating how a spreadsheet application having aspects of the present invention provides selections of formats to a user and organizes the data according to the user's input in the present invention.
Figure 11B:
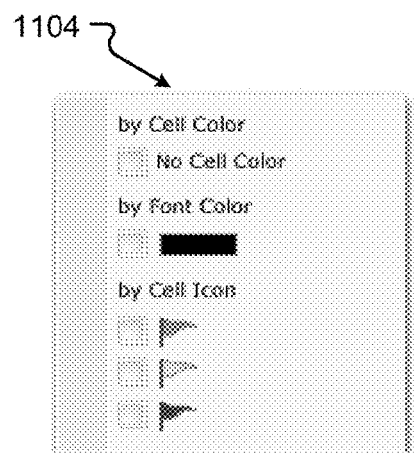
Figure 11C:
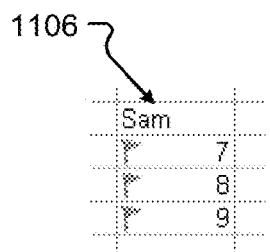

A filter operation by icon type is demonstrated in FIG. 11A, FIG. 11B, and FIG. 11C. A first display of the spreadsheet 1102 shows a column of data. Some of the data within the cells have icons, such as red flags, green flags, and yellow flags. The icon types are represented by menu selections in menu 1104. Upon selecting the icon type of a green flag, all cells without data with a green flag are hidden. The result is shown in the second display of the spreadsheet 1106. As is demonstrated, three cells are returned.

Figure 11D:
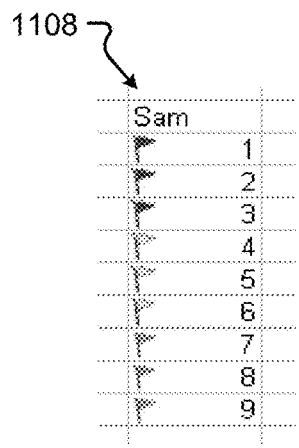
Figure 11E:
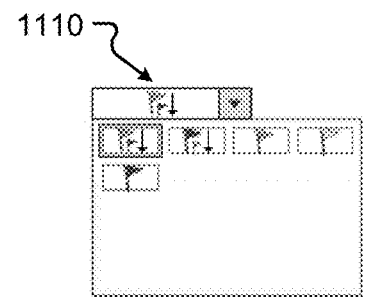
Figure 11F:
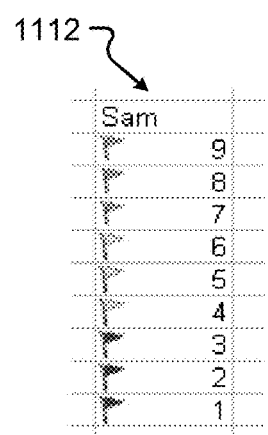

A sort operation by icon type is demonstrated in FIG. 11D, FIG. 11E, and FIG. 11F. A spreadsheet 1108 is shown in FIG. 11D. Spreadsheet 1108 and 1102 are the same. A menu 1110 is displayed with sort options according to the icon types in the data. In this embodiment, the sorts are from green flags to red flags or vice versa, green on top or bottom, yellow on top or bottom, or red on top or bottom. Upon selecting the green to red flags selection, table 1112 is returned. Here, all cells having data with a green flag are set on top of the table and all cells having a red flag are set on the bottom.

Figure 12:
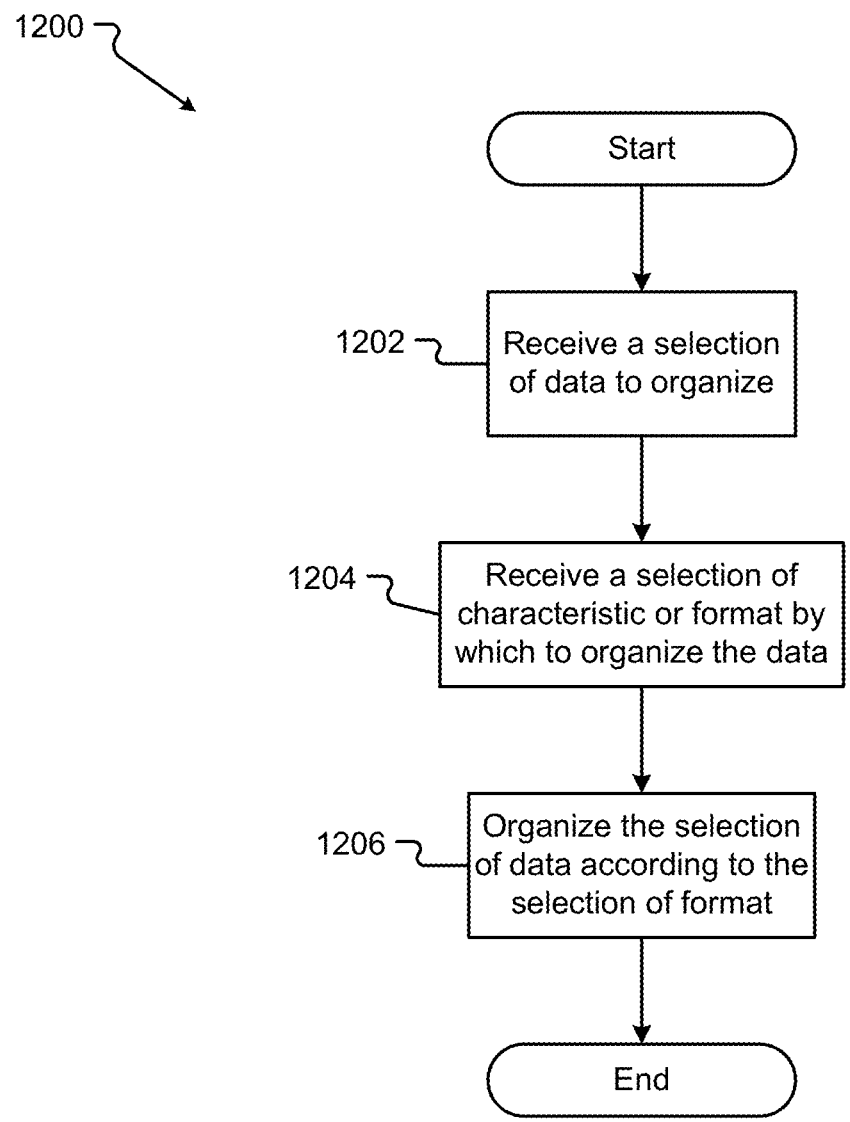
FIG. 12 shows an embodiment of a method for sorting a selection of data by a format according to the present invention.

Functional operations 1200 performed in accordance with embodiments of the present invention in organizing information are shown in FIG. 12. Initially, receive operation 1202 receives a selection of data. In one embodiment, the user highlights a section of data within the spreadsheet before initiating one of the user interfaces described above, in conjunction with FIG. 3, FIG. 4, FIG. 5, FIG. 6, and FIG. 7. In another embodiment, the user initiates one of the user interfaces from an active cell. The spreadsheet program selects the table of data as the data selection and uses the column or row as the set of data by which to organize the table of data. In still another embodiment, the user selects an Autofilter control, which selects the column of data as the data selection.

Next, receive operation 1204 receives a selection of a format property, such as color, by which to organize the selected data. In one embodiment, the user selects a format from a menu, such as menu 308, or other dialog, such as dialog window 702. A selection of a format, in some embodiments, includes a selection of how to organize according to that format. For example, the user selects to put the selected format at the top or bottom of the spreadsheet. In another example, the user selects to organize by two formats going from top to bottom. A user selects how to organize a range of cells with a format gradient in another example. Regardless, the user enters the format or formats by which to organize and enters how to use the formats in the organization operation. In alternative embodiments, the system may automatically select one or more formats for organization.

Organize operation 1206 organizes the data selection according to the selection of chosen format property, e.g., color. In one embodiment, the spreadsheet application assigns a cell location to each cell within a cell table. The cell table entries contain a reference or index to an entry in a format manager that stores format information about cells in the spreadsheet. In one embodiment, the data structure for the format manager is an array with references or indexes and one or more formats applied to the cell. The formats can include, but are not limited to, cell fill format, cell fill type, cell border type, cell border format, font type, font format, other font formats, icon type, or other formats.

The organize operation 1206 determines the reference for each cell in the data selection from the cell table. The organize operation 1206 then searches the format manager array for the reference. Upon finding the reference, the organize operation 1206 reviews the format data for that cell. If the cell has the format, according to the format data, which the user selected, that cell is flagged and stored in a temporary memory data structure. Upon finding all the cells with the selected format, the organize operation 1206 reformats the location of the cells within the data selection to place the cells with the format in the appropriate position according to the organization being accomplished. For example, if the user selected an organization with the formatted cells on top, the organize operation 1206 repositions the stored, formatted cells on the top of the spreadsheet or data selection. In one embodiment, the organize operation 1206 changes the value information for the cells within the cell table. For example, the organize operation 1206 finds the cell location in the cell table. Then, the organize operation 1206 swaps the value information stored with the cell locations to change the value information for the cells at the top of the spreadsheet. In another embodiment, the cell value information remains static and the cell location changes. Thus, the organize operation 1206 changes the cell location for the formatted cells to place the data within the formatted cells on top. One skilled in the art will recognize other organizing operations by the selected formats that are included in the scope of this invention.

Figure 13:
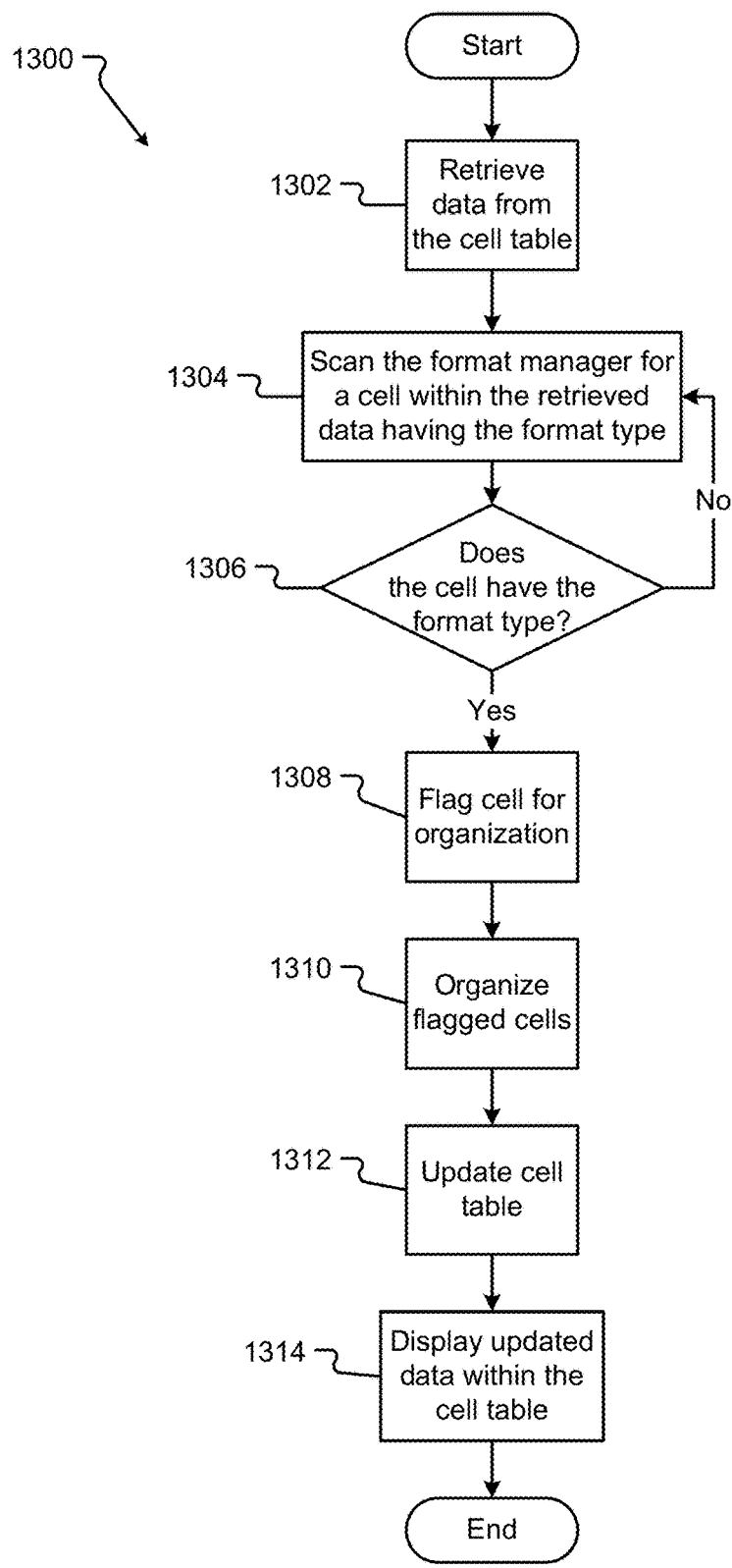
FIG. 13 shows an embodiment of a method for filtering a selection of data by a format according to the present invention.

A further embodiment of a method 1300 for organizing the selection of data within a spreadsheet is shown in FIG. 13. Here, retrieve operation 1302 receives a selection of data. The retrieve operation 1302 scans a cell table, such as cell table 1408, for the cell locations for all cells within the data selection. The retrieve operation 1302 then retrieves all format manager references, such as reference 1418, from the cell table. For example, if the user selects all cells in a particular column, the retrieve operation 1302 returns all cell references from the cell table for cells having a cell location within the particular column.

A scan operation 1304 receives the type of format to be used in the organization. Then, the scan operation 1304 scans a format manager, such as format manager 1414, for the references. Once a reference is found, the scan operation 1304 locates the field containing the value for the selected format type.

A compare operation 1306 compares the located value in the format field of the format manager to the value selected by the user. For example, if the user selected to organize the data by a cell fill color of red, the compare operation 1306 checks the cell fill color field to determine if the particular cell has a cell fill color value that is red. If the value differs from the selected format, then the compare operation 1306 returns to the scan operation 1304 to locate the next reference. However, if the format value is the same as the selected format, then a flag operation 1308 flags, for organization, the cell entry in the cell table with the reference.

The flag operation 1308 compiles all the flagged cells by the cell locations. The list of flagged cell locations are returned for organization. An organization operation 1310 receives a selection for type of organization, such as a sort or a filter. The organization operation 1310 determines by the user selection, such as cells on top, how to organize the flagged cells and directs an update to the cell table.

An update operation 1312 updates the data within the cell table to reflect the organization. As explained above with reference to FIG. 14, the location information associated with each cell may be static. Thus, the value information associated with the flagged cell locations is moved to new locations within the cell table different cell locations. In another embodiment, the location information associated with a cell value information may be dynamic. Thus, the update operation 1312 changes the cell location information stored with the flagged cell value information. Once the cell table is updated, a display operation 1314 displays the updated information in the cell table and the format manager.

Although the present invention has been described in language specific to structural features, methodological acts, and computer readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. A method executable on a computer system for organizing data cells, the computer system having a graphical user interface including a display device and one or more user interface selection devices, the method comprising:
   providing a sheet comprising a plurality of data cells, comprising:
     at least a first data cell associated with a first format;
     at least a second data cell associated with a second format; and
     at least a third data cell associated with a third format;
   receiving a selection of data cells within the plurality of data cells, wherein the selected data cells comprise at least the first data cell and the second data cell but not the third data cell, and wherein the selected data cells are not associated with the third format;
   analyzing the selected data cells to identify one or more formats associated with the selected data cells, wherein analyzing the selected data cells includes identifying the first format and the second format but not the third format;
   providing a menu, wherein the menu includes options for organizing the selected data cells, and wherein the options include the first format and the second format but not the third format;
   organizing the selected data cells based on the first format;
   displaying the organized data cells, including displaying at least the first data cell having the first format and at least the second data cell having the second format; and
   simultaneously displaying at least the third data cell associated with the third format.

2. The method of claim 1, further comprising:
   displaying additional options for organizing the selected data cells according to one or more cell arrangements, wherein the one or more cell arrangements comprise:
     displaying selected data cells having the first format above selected data cells not having the first format; and
     displaying selected data cells having the first format below selected data cells not having the first format.

3. The method of claim 2, further comprising:
   receiving a selection of one of the one or more cell arrangements; and
   displaying the selected data cells according to the selected cell arrangement.

4. The method of claim 1, wherein the first format, the second format, and the third format are different formats of a same format type.

5. The method of claim 4, wherein the format type is cell fill color, and wherein the first format, the second format, and the third format are different fill colors.

6. The method of claim 4, wherein the format type is font color, and wherein the first format, the second format and the third format are different font colors.

7. The method of claim 4, wherein the format type is an icon type, and wherein the first format, the second format, and the third format are different icon types.

8. The method of claim 1, wherein the options only comprise formats associated with the selected data cells.

9. The method of claim 1, further comprising:
   receiving a selection of the first format by which to organize the selected data cells.

10. The method of claim 9, wherein receiving the selection of the first format comprises activating the first data cell associated with the first format.

11. A computer system for organizing data cells in a data spreadsheet comprising:
   at least one processor; and
   at least one memory, communicatively coupled to the at least one processor and containing computer-readable instructions that when executed by the at least one processor cause the computer system to:
      provide a sheet comprising a plurality of data cells, comprising:
         at least a first data cell associated with a first format;
         at least a second data cell associated with a second format; and
         at least a third data cell associated with a third format;
      receive a selection of data cells within the plurality of data cells, wherein the selected data cells comprise at least the first data cell and the second data cell but not the third data cell, and wherein the selected data cells are not associated with the third format;
      analyze the selected data cells to identify one or more formats associated with the selected data cells, wherein analyzing the selected data cells includes identifying the first format and the second format but not the third format;
      provide a menu, wherein the menu includes options for organizing the selected data cells, and wherein the options include the first format and the second format but not the third format;
      organize the selected data cells based on the first format;
      display the organized data cells, including displaying at least the first data cell having the first format and at least the second data cell having the second format; and
      simultaneously display at least the third data cell associated with the third format.

12. The computer system of claim 11, further comprising:
   display additional options for organizing the selected data cells according to one or more cell arrangements, wherein the one or more cell arrangements comprise:
      display selected data cells having the first format above selected data cells not having the first format; and
      display selected data cells having the first format below selected data cells not having the first format.

13. The computer system of claim 12, further comprising:
   receive a selection of one of the one or more cell arrangements; and
   display the selected data cells according to the selected cell arrangement.

14. The computer system of claim 11, wherein the first format, the second format, and the third format are different formats of a same format type.

15. The computer system of claim 14, wherein the format type is cell fill color, and wherein the first format, the second format, and the third format are different fill colors.

16. The computer system of claim 14, wherein the format type is font color, and wherein the first format, the second format and the third format are different font colors.

17. The computer system of claim 14, wherein the format type is an icon type, and wherein the first format, the second format, and the third format are different icon types.

18. The computer system of claim 11, wherein the options only comprise formats associated with the selected data cells.

19. A non-transitory computer storage device having computer-readable instructions that when executed by a processing unit cause a computer system to:
   provide a sheet comprising a plurality of data cells, comprising:
      at least a first data cell associated with a first format;
      at least a second data cell associated with a second format; and
      at least a third data cell associated with a third format;
   receive a selection of data cells within the plurality of data cells, wherein the selected data cells comprise at least the first data cell and the second data cell but not the third data cell, and wherein the selected data cells are not associated with the third format;
   analyze the selected data cells to identify one or more formats associated with the selected data cells, wherein analyzing the selected data cells includes identifying the first format and the second format but not the third format;
   provide a menu, wherein the menu includes options for organizing the selected data cells, and wherein the options include the first format and the second format but not the third format;
   organize the selected data cells based on the first format;
   display the organized data cells, including displaying at least the first data cell having the first format and at least the second data cell having the second format; and
   simultaneously display at least the third data cell associated with the third format.

20. The non-transitory computer storage device of claim 19, wherein the options comprise only formats associated with the selected data cells.

* * * * *